US012000645B2

(12) United States Patent
Schroeder et al.

(10) Patent No.: US 12,000,645 B2
(45) Date of Patent: Jun. 4, 2024

(54) REFRIGERATOR WITH AN ASSISTED DOOR OPENER

(71) Applicant: Haier US Appliance Solutions, Inc., Wilmington, DE (US)

(72) Inventors: Michael Goodman Schroeder, Crestwood, KY (US); Stephanos Kyriacou, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/982,735

(22) Filed: Nov. 8, 2022

(65) Prior Publication Data

US 2024/0151458 A1 May 9, 2024

(51) Int. Cl.
*F25D 23/02* (2006.01)
*E05F 15/611* (2015.01)
*E05F 15/75* (2015.01)

(52) U.S. Cl.
CPC .......... *F25D 23/028* (2013.01); *E05F 15/611* (2015.01); *E05F 15/75* (2015.01)

(58) Field of Classification Search
CPC ..... E05F 15/622; E05F 15/619; E05F 15/611; E05F 15/75; F25D 23/028; F25D 23/02; E05Y 2201/434; E05Y 2201/474; E05Y 2201/702; E05Y 2201/71; E05Y 2900/31; E05Y 2201/426
See application file for complete search history.

(56) References Cited

U.S. PATENT DOCUMENTS

| | | | | |
|---|---|---|---|---|
| 10,301,865 | B2 * | 5/2019 | Son | E06B 5/00 |
| 10,648,218 | B1 * | 5/2020 | Schroeder | E05F 15/616 |
| 11,073,327 | B2 | 7/2021 | Kim | |
| 2011/0214349 | A1 * | 9/2011 | Chan | E05F 17/00 49/360 |
| 2015/0338156 | A1 * | 11/2015 | Held | E05D 7/00 312/405 |
| 2016/0312516 | A1 * | 10/2016 | Heydel | E05F 15/614 |
| 2018/0119475 | A1 * | 5/2018 | Kim | F25D 23/028 |
| 2018/0187470 | A1 * | 7/2018 | Song | F25D 23/087 |
| 2018/0223582 | A1 * | 8/2018 | Shin | E05F 15/619 |

(Continued)

FOREIGN PATENT DOCUMENTS

| | | |
|---|---|---|
| CN | 109114860 B | 12/2020 |
| EP | 3638966 B1 | 3/2021 |

(Continued)

*Primary Examiner* — Hiwot E Tefera
(74) *Attorney, Agent, or Firm* — Dority & Manning, P.A.

(57) ABSTRACT

A refrigerator appliance may include a cabinet, a door, a door opener, and a controller. The door opener may be attached to a cabinet and include a casing, a push rod, and a position sensor. The controller may be in operable communication with the door opener and configured to direct an opener operation. The opener operation may include receiving an opening prompt for the door opener, directing the push rod forward at a first extension speed in response to the received opening prompt, detecting the push rod at a first threshold between the retracted position and the extended position, and directing the push rod forward at a second extension speed in response to detecting the push rod at the first threshold, the second extension speed being less than the first extension speed.

7 Claims, 14 Drawing Sheets

(56) References Cited

U.S. PATENT DOCUMENTS

| | | | | |
|---|---|---|---|---|
| 2018/0283066 | A1* | 10/2018 | Lee | E05F 1/00 |
| 2018/0283077 | A1* | 10/2018 | Lee | E05D 3/16 |
| 2018/0291669 | A1* | 10/2018 | Kim | F25D 23/028 |
| 2018/0347892 | A1* | 12/2018 | Kim | F25D 29/00 |
| 2019/0106925 | A1* | 4/2019 | McCorkell | F16H 25/24 |
| 2019/0162006 | A1* | 5/2019 | Lee | E05F 15/619 |
| 2020/0056414 | A1* | 2/2020 | Oestermann | E05F 15/622 |
| 2021/0293071 | A1* | 9/2021 | Leonard | E05F 15/622 |
| 2022/0178194 | A1* | 6/2022 | Gunn | E05F 15/73 |

FOREIGN PATENT DOCUMENTS

| | | | |
|---|---|---|---|
| JP | 2001174146 | A | 6/2001 |
| KR | 102377618 | B1 | 3/2022 |

* cited by examiner

REFRIGERATOR WITH AN ASSISTED DOOR OPENER

FIELD OF THE INVENTION

The subject matter of the present disclosure relates generally to appliances having a cabinet and a door. For example, such appliances may include refrigerator appliances.

BACKGROUND OF THE INVENTION

Refrigerator appliances generally include a cabinet that defines one or more chilled chambers for receipt of food items for storage. One or more insulated, sealing doors are provided for selectively enclosing the chilled food storage chamber(s). Generally, the door(s) are movable between a closed position and an open position for accessing food items stored therein by pulling on the door(s), such as by pulling on a handle on the door.

In some instances, for example, when a user's hands are full of groceries to load into the refrigerator or are covered in raw food ingredients from cooking, etc., a user may prefer to open the door without having to grasp the door, or a part of the door such as the handle, in the user's hand. For instance, a user may prefer to nudge or push on the door to open the door.

In the past, attempts to provide assisted door openers have suffered from a number of drawbacks. For one, existing systems have had difficulty ensuring consistent opening results over time. For instance, as certain elements (e.g., the door or gasket) settle and wear, the alignment between a door opener and door (or parts thereof) may change. However, features or steps for addressing such drawbacks have been cumbersome or difficult. In many cases, a specialized technician has been required to fix or address faulty or poor opening results. Separate from or in addition to ensuring consistent results, noise is often a concern with considering any automated feature, such as in a refrigerator appliance. In short, users typically desire any features operate at a relatively low volume Accordingly, a refrigerator having an improved means for opening a door thereof would be useful. In particular, a refrigerator appliance having features for ensuring consistent opening results would be desirable. Additionally or alternatively, a refrigerator appliance having features for maintaining alignment between a door opener and a door (e.g., automatically or without direct user intervention) would be advantageous. Further additionally or alternatively, it would be desirable for any automated feature (e.g., door opener) to operate at a quiet or low volume level.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a refrigerator appliance is provided. The refrigerator appliance may include a cabinet, a door, a door opener, and a controller. The cabinet may define a food storage chamber. The food storage chamber may extend between a front portion and a back portion along a transverse direction. The front portion of the food storage chamber may define an opening for receipt of food items. The door may be positioned at the front portion of the food storage chamber and movable between a closed position and an open position to selectively sealingly enclose the food storage chamber in the closed position and provide access to the food storage chamber in the open position. The door opener may be attached to the cabinet and include a casing, a push rod, and a position sensor. The casing may be fixedly mounted to the cabinet. The push rod may extend through the casing towards the door and movable relative to the casing between a retracted position and an extended position to motivate the door toward the open position. The position sensor may be attached to the cabinet to detect a position of the push rod relative to the casing. The controller may be in operable communication with the door opener and configured to direct an opener operation. The opener operation may include receiving an opening prompt for the door opener, directing the push rod forward at a first extension speed in response to the received opening prompt, detecting the push rod at a first threshold between the retracted position and the extended position, and directing the push rod forward at a second extension speed in response to detecting the push rod at the first threshold, the second extension speed being less than the first extension speed.

In another exemplary aspect of the present disclosure, a method of operating a door opener of a refrigerator appliance is provided. The method may include receiving an opening prompt for the door opener. The method may also include directing a push rod of the door opener forward at a first extension speed in response to the received opening prompt. The method may further include detecting the push rod at a first threshold between a retracted position and an extended position. The method may still further include directing the push rod forward at a second extension speed in response to detecting the push rod at the first threshold, the second extension speed being less than the first extension speed.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
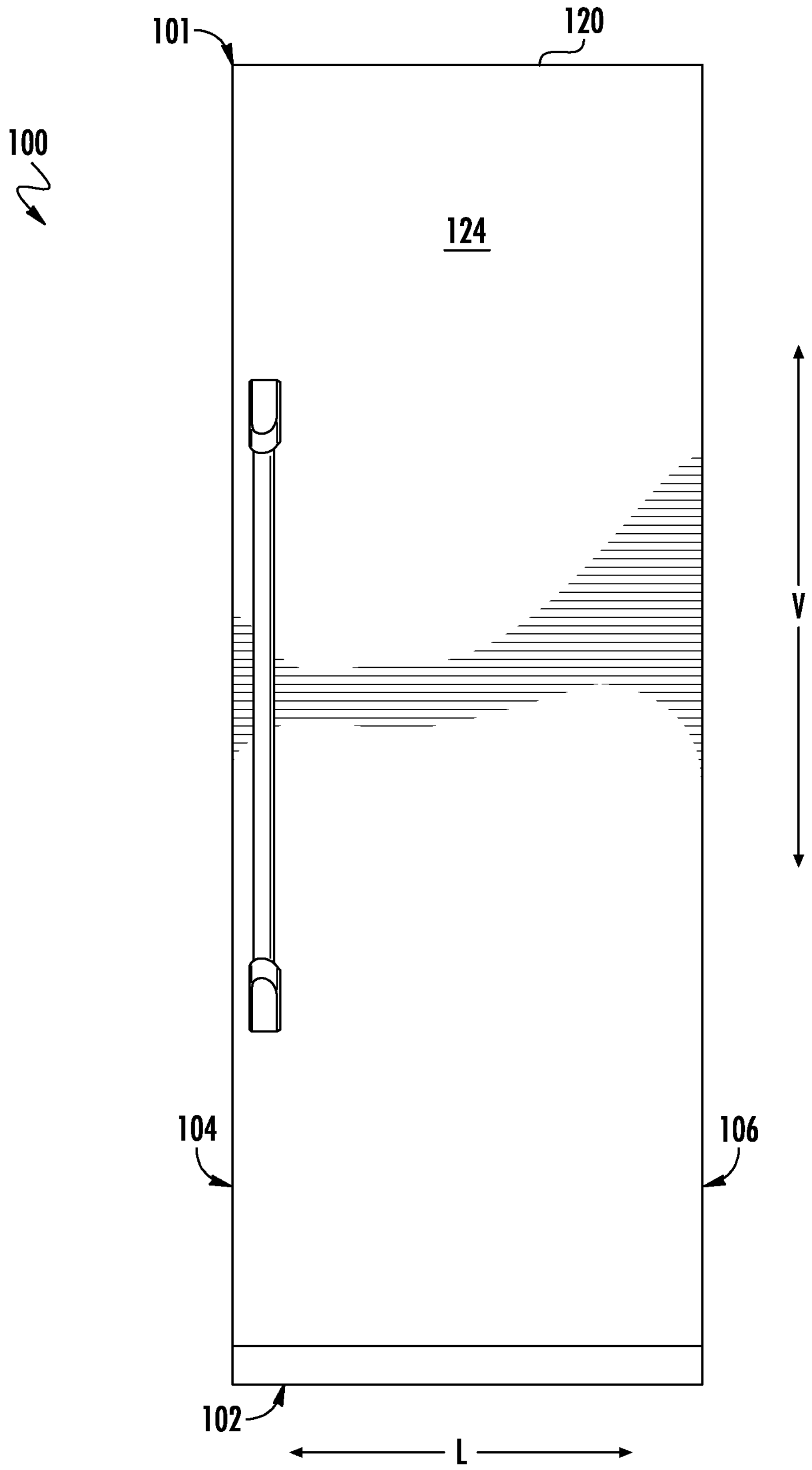
FIG. 1 provides a front elevation view of a refrigerator appliance according to according to exemplary embodiments of the present disclosure, wherein a door of the refrigerator appliance is shown in the closed position.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. Terms such as "left," "right," "front," "back," "top," or "bottom" are used with reference to the perspective of a user accessing the refrigerator appliance. For example, a user stands in front of the refrigerator to open the door(s) and reaches into the food storage chamber(s) to access items therein.

Figure 2:
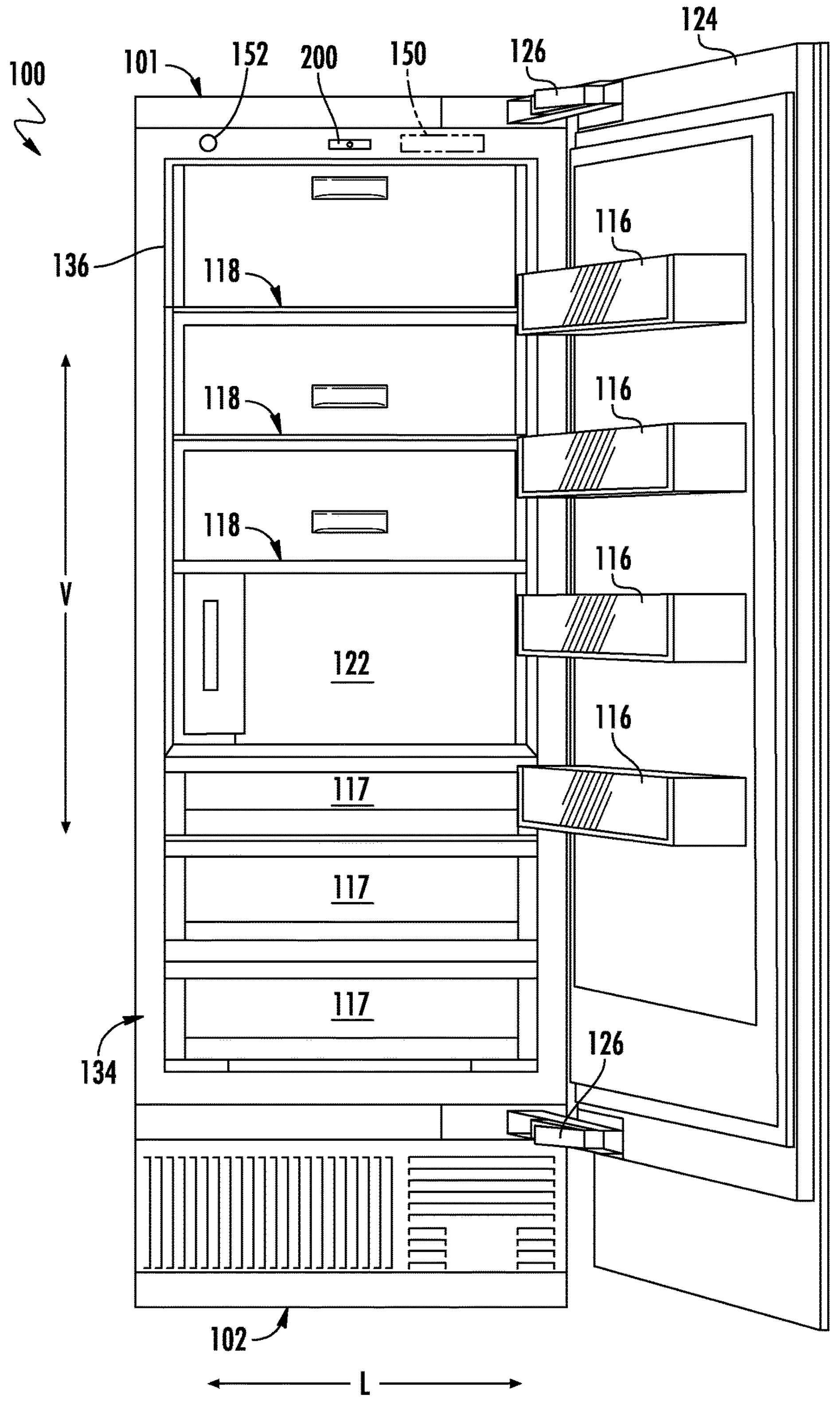
FIG. 2 provides a front elevation view of the exemplary refrigerator appliance of FIG. 1, wherein the door is shown in an open position.
Figure 3:
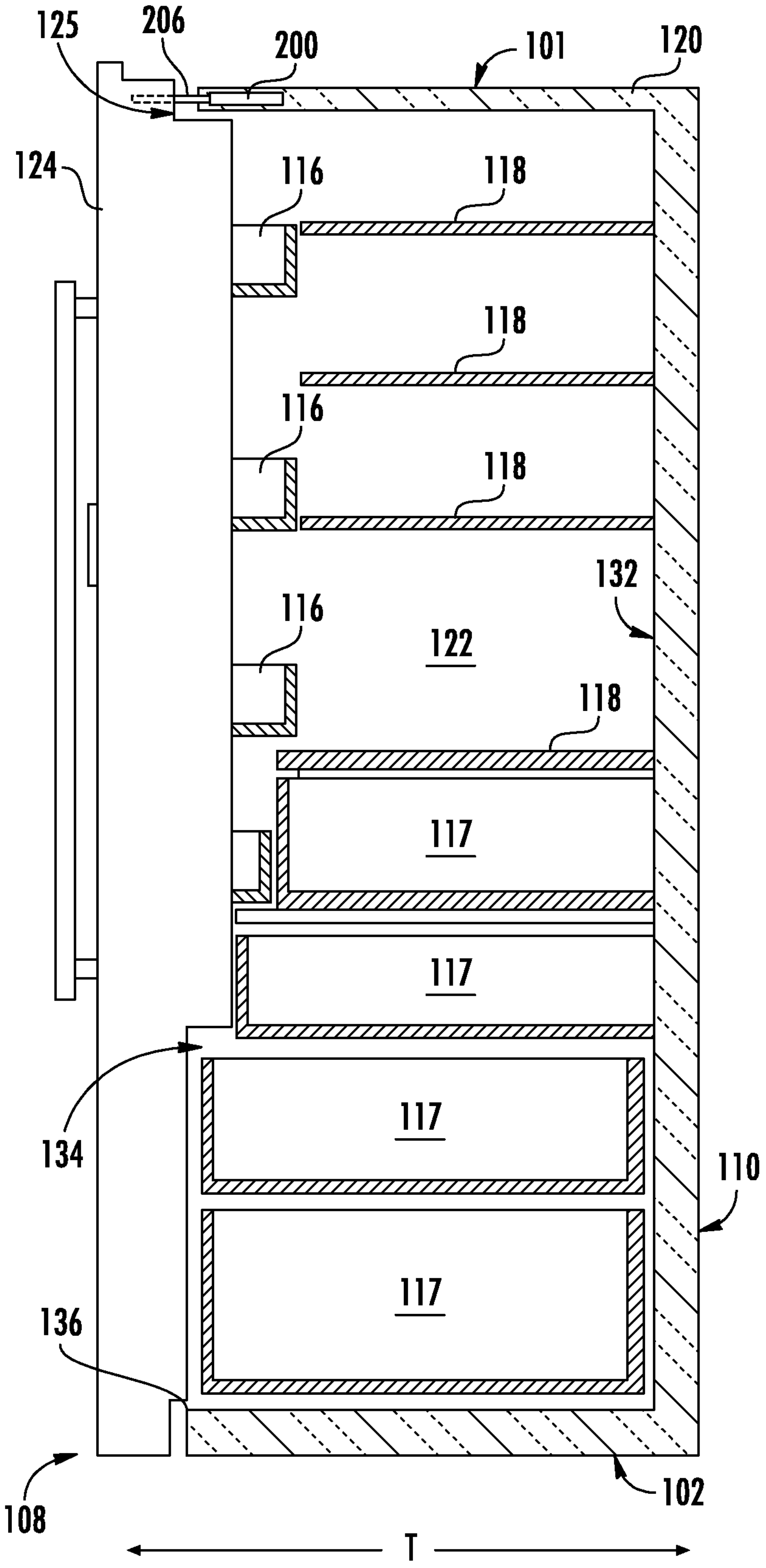
FIG. 3 provides a sectional elevation view of the exemplary refrigerator appliance of FIG. 1.

As illustrated in FIGS. 1 through 3, an exemplary refrigerator appliance 100 has an insulated housing or cabinet 120 that defines a food storage chamber 122. A door 124 is provided to selectively sealingly enclose the food storage chamber 122 when in a closed position (FIG. 1) and provide access to the food storage chamber 122 when in an open position (FIG. 2). The door 124 is rotatably mounted to the cabinet 120, such as by one or more hinges 126 (FIG. 2), to rotate between the open position and the closed position.

Refrigerator appliance 100 defines a vertical direction V, a lateral direction L, and a transverse direction T (FIG. 3), each mutually perpendicular to one another. As may be seen in FIGS. 1 through 3, the cabinet or housing 120 extends between a top 101 and a bottom 102 along the vertical direction V, between a left side 104 and a right side 106 along the lateral direction L, and between a front 108 (FIG. 3) and a rear 110 (FIG. 3) along the transverse direction T. As may be seen in FIGS. 2 and 3, the food storage chamber 122 extends between a front portion 134 and a back portion 132 along the transverse direction T. The front portion 134 of the food storage chamber 122 defines an opening 136 for receipt of food items. The food storage chamber 122 is a chilled chamber 122 for receipt of food items for storage. As used herein, the chamber may be "chilled" in that the chamber is operable at temperatures below room temperature (e.g., less than about seventy-five degrees Fahrenheit—

75° F.). One of ordinary skill in the art will recognize that the food storage chamber 122 may be chilled by a sealed refrigeration system, such that the food storage chamber 122 may be operable at or about the temperatures described herein by providing chilled air from the sealed system. The structure and function of such sealed systems are understood by those of ordinary skill in the art and are not described in further detail herein for the sake of brevity and clarity.

Refrigerator door 124 is rotatably mounted (e.g., hinged) to an edge of cabinet 120 for selectively accessing the fresh food storage chamber 122 within the cabinet 120. Refrigerator door 124 may be mounted to the cabinet 120 at or near the front portion 134 of the food storage chamber 122 such that the door 124 moves (e.g., rotates via hinges 126) between the closed position (FIG. 1) and the open position (FIG. 2). In the closed position of FIG. 1, the door 124 sealingly encloses the food storage chamber 122. Additionally, one or more gaskets and other sealing devices, which are not shown but will be understood by one of ordinary skill in the art, may be provided to promote sealing between the door 124 and the cabinet 120. In the open position of FIG. 2, the door 124 permits access to the fresh food storage chamber 122.

As shown for example in FIGS. 2 and 3, various storage components may be mounted within the food storage chamber 122 to facilitate storage of food items therein as will be understood by those skilled in the art. In particular, the storage components include bins 116, drawers 117, and shelves 118 that are mounted within fresh food chamber 122. Bins 116, drawers 117, and shelves 118 are configured for receipt of food items (e.g., beverages or solid food items) and may assist with organizing such food items.

As depicted, cabinet 120 defines a single chilled chamber 122 for receipt of food items for storage. In the present example, the single chilled chamber 122 is a fresh food chamber 122. In some embodiments, the chilled chamber may be a freezer chamber or the refrigerator appliance 100 may include one or more additional chilled chambers for receipt of various food items and storage of such items at various temperatures as desired. For example, the refrigerator appliance 100 may include one or more chilled chambers configured for deep freeze (e.g., at about 0° F. or less) storage, or configured for chilling (e.g., produce or wine) at relatively warmer temperatures such as about 60° F. or more (while still below room temperature, as noted above), as well as any suitable temperatures between the stated examples. In various exemplary embodiments, the chilled chamber 122 may be selectively operable at any number of various temperatures or temperature ranges as desired or required per application, or the refrigerator appliance 100 may include one or more additional chambers selectively operable at any suitable food storage temperature.

Refrigerator appliance 100 generally includes a controller 150 that is operatively coupled to, or in communication with, components of a refrigeration system of refrigerator appliance 100 configured for cooling chilled chamber 122. As would be understood, such components may include a compressor, an evaporator fan, and a condenser fan. Controller 150 can selectively operate such components in order to cool chilled chamber 122. Controller 150 may also in is also in communication with a thermostat (e.g., a thermocouple or thermistor) positioned in the chilled chamber 122. Controller 150 may receive a signal from the thermostat that corresponds to a temperature of chilled chamber 122. Controller 150 may also include an internal timer for calculating elapsed time periods.

Controller 150 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In some embodiments, the processor executes non-transitory programming instructions stored in memory. For certain embodiments, the instructions include a software package configured to operate appliance 100 or execute an opener operation (e.g., the exemplary method 600 described below with reference to FIG. 13). The memory may be a separate component from the processor or may be included onboard within the processor. Alternatively, controller 150 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

Controller 150 may be positioned in a variety of locations throughout refrigerator appliance 100. Input/output ("I/O") signals may be routed between controller 150 and various operational components of refrigerator appliance 100. One or more components of refrigerator appliance 100 may be in communication (e.g., electrical communication) with controller 150 via one or more conductive signal lines or shared communication busses. Additionally or alternatively, one or more components of refrigerator appliance 100 may be in operable communication (e.g., wireless communication) with controller 150 via one or more wireless signal bands.

In certain embodiments, a door switch 152 (e.g., reed switch, pusher switch, etc.) is provided in operable communication with controller 150 and selectively engaged with the door 124 to detect if/when the door 124 is in an open position or otherwise moved from a closed position. Such switches are generally understood and may, for instance, simultaneously control activation of a light for illuminating the chilled chamber 122. Opening the refrigerator door 124 may thus activate the light and indicate the door is no longer in the closed position.

The illustrated exemplary refrigerator appliance 100 is generally referred to as a single-door or single-purpose refrigerator, sometimes also referred to as a column refrigerator. It is recognized, however, that the benefits of the present disclosure apply to other types and styles of refrigerators such as, for example, a bottom mount refrigerator, a top mount refrigerator, a side-by-side style refrigerator, or a freezer appliance. Consequently, the description set forth herein is for illustrative purposes only and is not intended to be limiting in any aspect to a particular refrigerator chamber configuration. Additionally, door openers as described herein may be useful in other types of appliances such as microwave oven appliances, clothes washer/dryer appliances, etc., or other contexts wherever the disclosed features may be desired.

As may be seen in FIGS. 2 and 3, the refrigerator appliance 100 may include a door opener 200. The door opener 200 may be positioned in the cabinet 120 or attached to the cabinet 120. For example, the door opener 200 may be positioned outside of and adjacent to the chamber 122. In some exemplary embodiments, the door opener 200 may touch or be embedded within the thermal insulation (e.g., foam) surrounding the chamber 122. In other exemplary embodiments, the door opener 200 may be attached to the exterior of the cabinet 120, above the top of the cabinet 120. For example, the door opener 200 may be positioned proximate the front 108 of the cabinet 120 and the opening 136 of the food storage chamber 122. In the illustrated exemplary embodiment, the door opener 200 is positioned proximate the top 101 of the cabinet 120 along the vertical direction V and is generally centered along the lateral direction L. That is, the example door opener 200, as best seen in FIG. 2, is positioned at or about a lateral midpoint of the cabinet 120 or the opening 136 of the food storage chamber 122. In other embodiments, the door opener 200 may be positioned at other locations, such as near the bottom 102 along the vertical direction V. In some embodiments, centering the door opener 200 along the lateral direction L may advantageously provide flexibility in mounting the door 124. For example, the illustrated refrigerator appliance 100 includes the door 124 mounted on the right side 106. In other embodiments, the door 124 (e.g., the hinges 126) may be mounted to the cabinet 120 at or near the left side 104. In embodiments where the door opener 200 is centered along the lateral direction L, the door opener 200 will apply generally the same opening force to the door 124 when the door 124 is mounted to either left side 104 or right side 106. For instance, moment arm or leverage applied to the door 124 as it rotates about the hinges 126 will be generally the same.

Generally, door opener 200 includes a casing 202 and push rod (e.g., screw) 206. As shown, casing 202 is joined to the cabinet 120 (e.g., via mechanical fasteners). Thus, the casing 202 may be fixedly mounted to the cabinet 120 in that the casing 202 is not movable relative to the cabinet 120 during the ordinary and intended operation of the refrigerator appliance 100 (including the door opener 200 thereof). Push rod 206 is movable relative to the casing 202 of the door opener 200 and relative to the cabinet 120 of the refrigerator appliance 100. Thus, push rod 206 may be selectively moved toward (and subsequently away from) door 124 to open the same. For instance, the push rod 206 may be movable along an axial direction (e.g., parallel to the transverse direction T) between a retracted position RP (FIG. 6, dashed lines) and an extended (e.g., fully extended) position (FIG. 6, dash-dot lines) to force door 124 forward such that door 124 may pivot open. As illustrated, in the retracted position RP, the push rod 206 may be held flush with or behind casing 202 (e.g., at the tip 212) while the extended position EP may hold the push rod 206 forward outside of casing 202 (e.g., at the tip 212). Between the retracted and extended positions RP, EP, a zero or partially-extended position EP (FIG. 3) may be established to contact an interior surface of the door 124 in the closed position (e.g., as will be described below).

Figure 9:
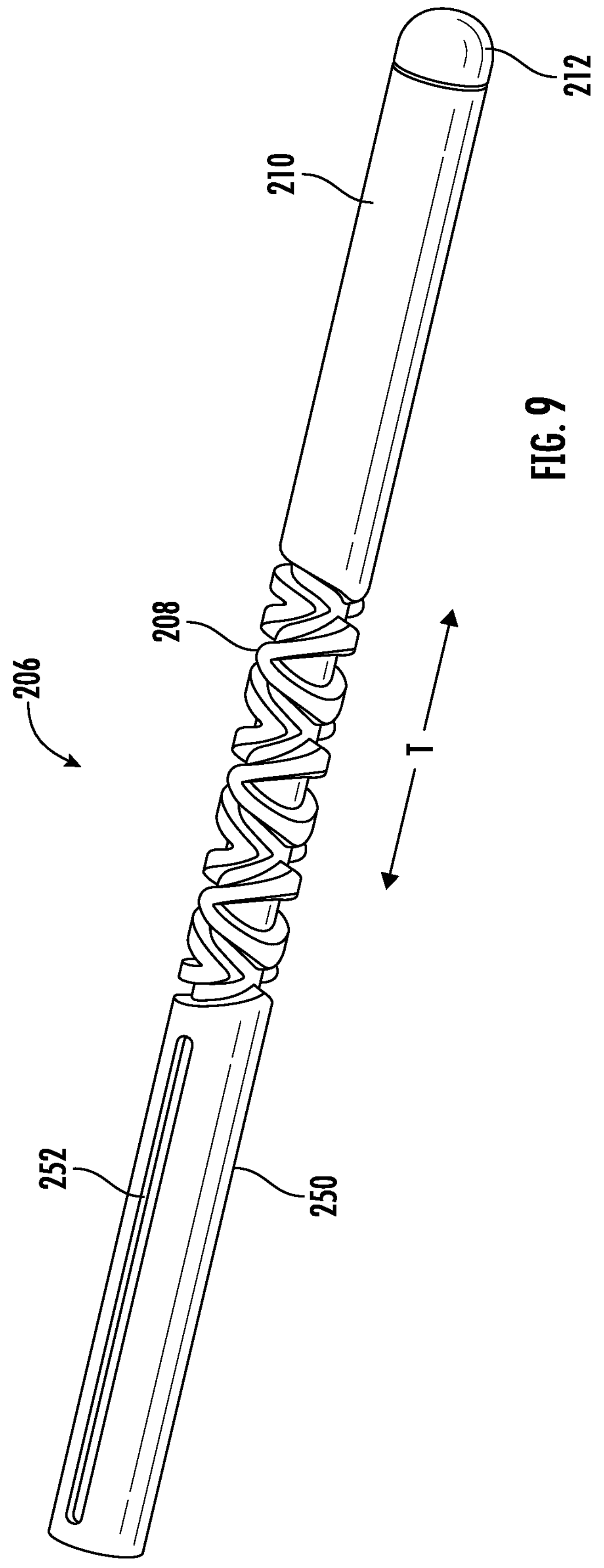
FIG. 9 provides a perspective view of an exemplary push rod according to exemplary embodiments of the present disclosure, which may be incorporated into a door opener such as the exemplary door opener of FIG. 4.
Figure 11:
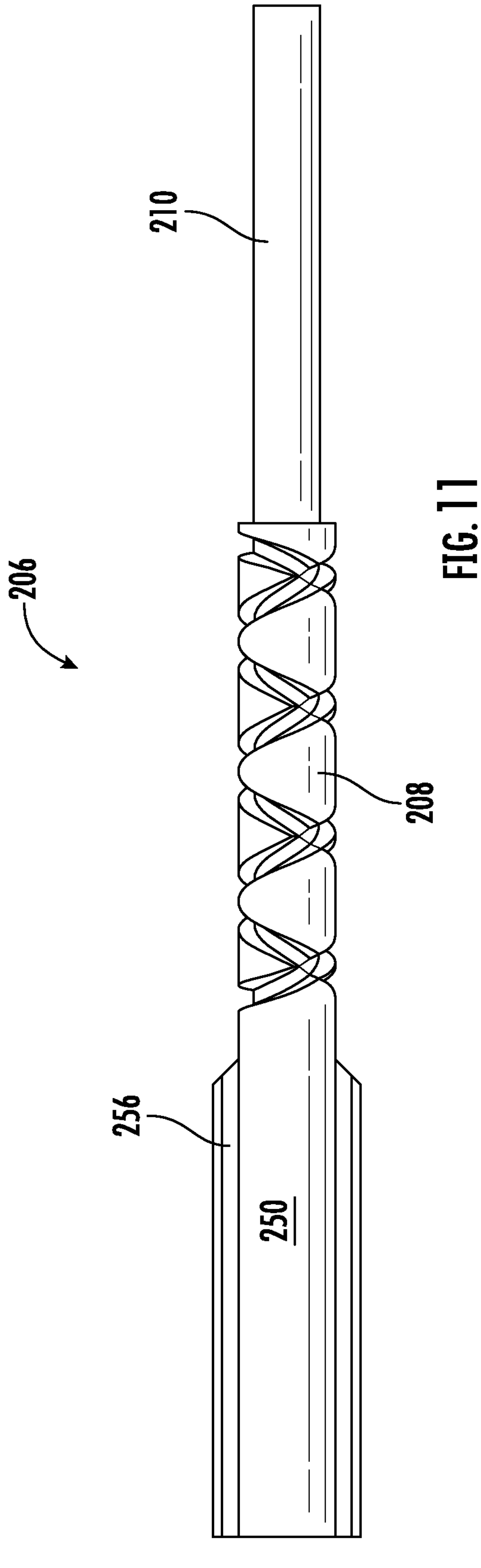
FIG. 11 provides a side elevation view of an exemplary push rod according to exemplary embodiments of the present disclosure, which may be incorporated into a door opener such as the exemplary door opener of FIG. 4.

In some embodiments, push rod 206 includes a front portion or rod portion 210 and a threaded middle portion 208. The push rod 206 may also include a back portion 250 having guide elements defined thereon. For example, the guide elements may constrain the push rod 206 against rotation about the transverse direction T, whereby the push rod 206 may translate generally along the transverse direction T (described further below) with little or no twisting or rotation about the transverse direction T. In various embodiments, the guide elements include one or more slots 252 (e.g., FIG. 6 and FIG. 9) or one or more fins 256 (e.g., FIG. 11). The slot(s) 252, when provided, may receive tabs 254 (FIG. 6) of the casing 202 therein to constrain the push rod 206 against rotation about the transverse direction T. The fin(s) 256, when provided, may be received within corresponding slots defined in the casing 202 to constrain the push rod 206 against rotation about the transverse direction T.

In some embodiments, the push rod 206 includes a tip 212 (see, e.g., FIG. 6) which engages the inner surface 125 of the door 124. The push rod 206 (e.g., rod portion 210 thereof) may extend through the casing 202 towards the door 124 of the refrigerator appliance 100 (e.g., as may be seen in FIG. 3). As depicted in FIG. 3, the door opener 200 is in a zero position. FIG. 3 illustrates the zero position of the door opener 200, and in particular the push rod 206 thereof, relative to the cabinet 120 of the refrigerator appliance 100. Additionally, the door opener 200 may be movable (e.g., forward along the transverse direction T) from the zero position to an extended position EP, as shown in the dashed lines of FIG. 6, where the push rod 206 extends from the casing 202 sufficiently to urge the door 124 away from the cabinet 120 (e.g., away from the closed position of the door 124 illustrated in FIG. 3 and towards the open position of the door 124 illustrated in FIG. 2).

In some embodiments, one or more sensors 302 or 304 configured to detect relative movement between the push rod 206 and the casing 202. Specifically, such sensor(s) 302 or 304 may be in operable communication with the motor 204 or controller 150. Thus, the sensor(s) 302 or 304 may be configured to transmit a signal to the controller 150 or motor 204 in response to (e.g., when) the sensor(s) 302 or 304 detecting movement of the push rod 206. Optionally, the controller 150 or motor 204 may be configured to receive the signal from the sensor(s) 302 or 304, to activate in response to the signal from the sensor(s) 302 or 304, and to move the push rod 206 towards the front portion 108 of the cabinet 120 or the front portion of the casing 202 along the transverse direction T.

In some embodiments, the sensor(s) include a position sensor 302. For instance, the position sensor 302 may be provided on or in communication with push rod 206 (e.g., at a rear end thereof). Generally, position sensor 302 may include any suitable sensor configured to detect the relative position of push rod 206 between the retracted and extended positions RP, EP (e.g., including such positions). As an example, position sensor 302 may include or be provided as a time-of-flight (TOF) sensor configured to calculate a distance between a portion of push rod 206 and a fixed element (e.g., a predetermined portion of casing 202). As an additional or alternative example, position sensor 302 may include or be provided as a linear encoder or potentiometer configured to sense or respond to a change in the length of the linear sensor 302, where the length of the linear sensor 302 is defined along the transverse direction T between the casing 202 and the push rod 206.

Figure 14:
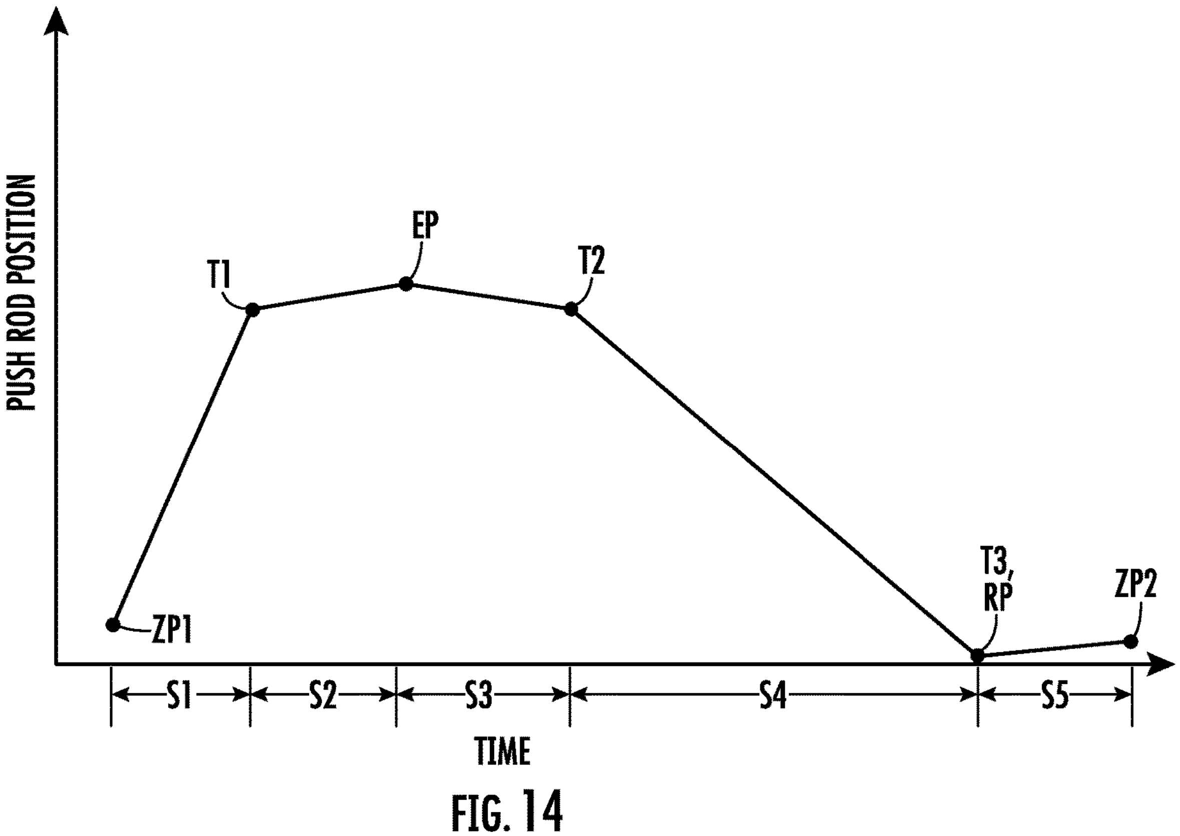
FIG. 14 provides a graph illustrating a monitored position of a push rod over time during operation of a door opener according to exemplary embodiments of the present disclosure.

Turning briefly to FIG. 14, a graph is provided to illustrate a monitored position of the push rod (e.g., push rod 206, as detected at the position sensor 302—FIG. 4) over time during operation of the door opener 200 (e.g., to open the door 124 or otherwise move the door 124 from the closed position). As illustrated, the push rod may start in an at least partially withdrawn position, such as a first zero position ZP1 (e.g., at a retracted position RP or between a retracted position RP and an extended position EP) at a point in time in which (e.g., immediately after) a user has given an opening prompt (e.g., by pushing the door).

From the first zero position ZP1, the push rod may be extended or moved forward at a first extension speed (i.e., position over time) over a first segment 51 to a first threshold T1, which may be defined as a point along the movement path of the push rod. Generally, the first threshold T1 is between the retracted and extended position RP, EP and is forward from the retracted position RP or first zero position ZP1. Moreover, the first threshold T1 may be rearward from the extended position EP. Upon reaching the first threshold T1, a second segment S2 may begin. For the second segment S2, the speed of the push rod's forward movement may be slowed to a second extension speed that is less than the first extension speed. At the second extension speed, the push rod may continue to advance forward (e.g., to the extended position EP).

Once the push rod's forward movement is halted (e.g., at the extended position EP), the push rod may be withdrawn or directed rearward over a third segment S3 at a first retraction speed. Optionally, the magnitude or absolute value of the first retraction speed may be less than the magnitude or absolute value of the first extension speed. Additionally or alternatively, the magnitude or absolute value of the first retraction speed may substantially equal to the magnitude or absolute value of the second extension speed. The push rod may continue rearward at the first retraction speed until a second threshold T2 is reached. Generally, the second threshold T2 is between the retracted and extended position EP and rearward from the extended position EP. Optionally, the second threshold T2 may be equal to (e.g., at the same location relative to the movement path as) the first threshold T1.

Upon reaching the second threshold T2, a fourth segment S4 may begin. Over the fourth segment S4, the speed of the push rod's rearward movement may be increased to a second retraction speed that is greater than the first retraction speed. Optionally, the magnitude or absolute value of the second retraction speed may be less than the magnitude or absolute value of the first extension speed. Additionally or alternatively, the magnitude or absolute value of the second retraction speed may greater than the magnitude or absolute value of the second extension speed. The retraction of the push rod may continue (e.g., at the second retraction speed) until a third threshold T3 is reached. Optionally, the third threshold T3 may be equal to the retracted position RP.

Upon reaching the third threshold T3, the push rod may again be extended or moved forward (e.g., over a fifth segment S5). The extension from the third threshold T3 may be set at a third extension speed (e.g., less than the first extension speed or the second extension speed). Extension at the third extension speed may continue, for instance, until a new zero position ZP2 (e.g., equal to or different from the first zero position ZP1). Optionally, the new zero position ZP2 may be determined as the position in which the push rod contacts the door. Advantageously, consistent contact and communication between the door opener and the door may be maintained (e.g., without direct user input).

Returning especially to FIG. 3, in additional or alternative embodiments, the sensor(s) include a rod-load sensor 304, configured to detect (e.g., directly or indirectly) a relative load or pressure applied to the push rod 206. As an example, the rod-load sensor 306 may be provided as a Hall-effect sensor at a first element (e.g., spring 232) and a mated magnet 306A fixed relative to a separate second element (e.g., push rod 206).

Figure 15:
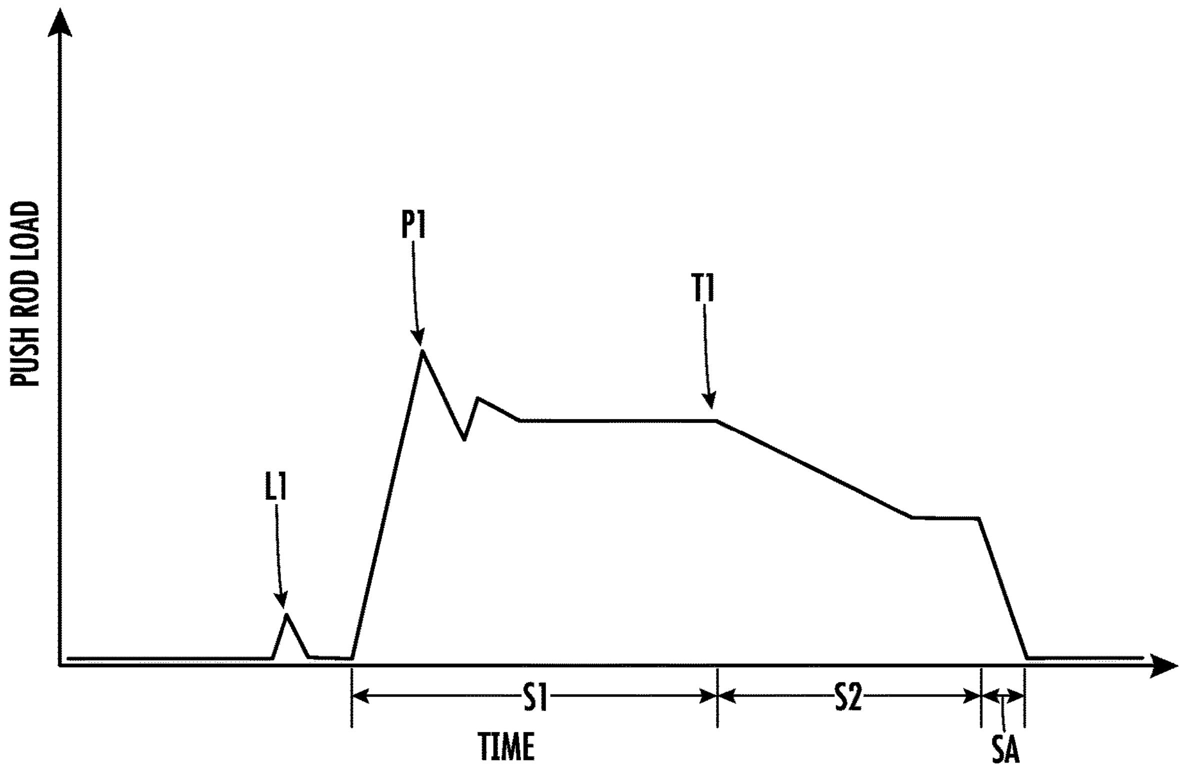
FIG. 15 provides a graph illustrating a monitored rod load of a push rod over time during operation of a door opener according to exemplary embodiments of the present disclosure.

Turning briefly to FIG. 15, a graph is provided to illustrate a monitored load of the push rod (e.g., push rod 206, as detected at the rod-load sensor 304—FIG. 4) over time during operation of the door opener 200 (e.g., to open the door 124 or otherwise move the door 124 from the closed position). As illustrated, the load on the push rod may start at a baseline load (e.g., no load). From the baseline, the push rod may receive an input load spike L1, such as might be provided by a user pushing against the door to prompt the door opener to open the door—or otherwise move the door from the closed position.

In response to receiving the input load spike L1, the push rod may be driven forward, increasing the load on the push rod until a seal is broken between a door gasket and the cabinet (e.g., as indicated at point P1). Once the seal is broken, the push rod may be extended or moved forward (e.g., at a first extension speed) to a first threshold T1. As described above, with respect to FIG. 14, upon reaching the first threshold T1, the speed of the push rod's forward movement may be slowed (e.g., to a second extension speed), which may decrease the load on the push-rod.

In some embodiments or under some conditions, even though the door opener is opening the door or otherwise moving the push rod forward, a user may seek to interrupt the directed or automatic opening of the door. Under such conditions, the load on the push rod may decrease rapidly. In other words, a relatively large variation (e.g., decrease in load over the time of an unanticipated segment SA) may be detected. It may be determined that the variation is above a set condition. In response to such a determination, the door opener may respond, such as by withdrawing the push rod to the retracted position RP. Notably, the push rod may be protected from inadvertent or sudden strikes, door closing, or damage.

Returning generally to FIGS. 2 through 7, the push rod 206 may be biased forward (e.g., towards front 108) along the transverse direction T by a protective spring 232. For example, the protective spring 232 may provide resiliency in the event that the door 124 is closed while the door opener 200 is in the extended position EP. For instance, the protective spring 232 may permit the push rod 206 and slip yoke 240 to deflect rearward (e.g., towards rear 110) while the spring 232 absorbs the force from the door 124 when the door 124 is closed while the door opener 200 is in the extended position EP.

Generally, door opener 200 includes a motor 204 in mechanical communication with push rod 206 to direct or control movement of the push rod 206. For instance, motor 204 may be in operable (e.g., electrical or wireless communication) with controller and actuate push rod 206 according to one or more signals received from or transmitted to controller 150. In optional embodiments, door opener 200 is self-reversing or automatically reversing. For example, the push rod 206 may reciprocate (e.g., move forward and rearward between, and including, the zero position and the extended position EP) generally along transverse direction T. In at least some embodiments, such reciprocal motion may be driven by motor 214. For instance, motor 214 may rotate a drive gear 216 and such rotation may be transferred to the push rod 206 in a manner that causes the push rod 206 to translate linearly (e.g., back and forth between and including the zero position and the extended position EP), as will be described in more detail below. Such reciprocation may include, for example, the push rod 206 moving in a first direction (e.g., forwards, such as towards front 108) along the transverse direction T from the zero position to the extended position EP followed by moving in a second direction generally opposite the first direction (such as generally 180° away from the first direction) (e.g., rearward, such as towards rear 110) along the transverse direction T from the extended position EP to the zero position. For example, in some embodiments the motor 214 may rotate the drive gear 216 in a single direction while the push rod 206 reciprocates generally along the transverse direction T. As another example, in at least some embodiments the motor 214 may rotate the drive gear 216 continuously while the push rod 206 reciprocates generally along the transverse direction T. Further, in some embodiments, the drive gear 216 may rotate both continuously and in a single direction (e.g., clockwise or counterclockwise). Such continuous rotation of the drive gear 216 by the motor 214 may be variable and, thus, not at a single speed (e.g., the rotation may speed up or slow down). Nonetheless, unidirectional rotation of the drive gear 216, which may be transferred to the push rod 206 via one or more intervening elements (e.g., gears and a guide blade, as described in more detail below), may cause the push rod 206 to move back and forth (e.g., in the first direction and the opposing second direction as described above). Thus, for example, the push rod 206 may be self-reversing at least in that the push rod 206 moves in two opposing directions without the motor 214 stopping or without the motor 214 changing a direction of rotation of the motor 214 or drive gear 216.

As noted above, push rod 206 may translate (e.g., reciprocate) linearly along an axial direction. For instance, as may be seen throughout FIGS. 4 through 6, the door opener 200 may include a plurality of gears to transfer rotation from the motor 214 to the push rod 206 whereupon the push rod 206 will translate linearly due to the interaction of a guide blade 262 with threads of the push rod 206. In particular, FIG. 5 illustrates an exemplary plurality of gears with several adjacent components (e.g., housings or gear boxes) omitted in order to illustrate the exemplary gears more clearly. In some embodiments, the plurality of gears may include a step-down gear 218 engaged with the drive gear 216. For instance, the step-down gear 218 may be directly engaged with the drive gear 216, such that external teeth 220 of the drive gear 216 bear against and are in direct contact with a first set of external teeth 222 of the step-down gear 218, whereby rotation of the drive gear 216 causes the step-down gear 218 to rotate. For instance, the rotation of the drive gear 216 by the motor 214 is directly transferred from the drive gear 216 to the step-down gear 218. As best seen in FIG. 5, the step-down gear 218 may also include a second set of external teeth 224, and the second set of external teeth 224 may be engaged with external teeth 228 of a gear 226 (e.g., directly engaged with in the same manner as described above with respect to the step-down gear 218 and the drive gear 216), whereby rotation of the step-down gear 218 causes the gear 226 to rotate via the engagement of the second external teeth 224 of the step-down gear 218 with the external teeth 228 of the gear 226.

Figure 4:
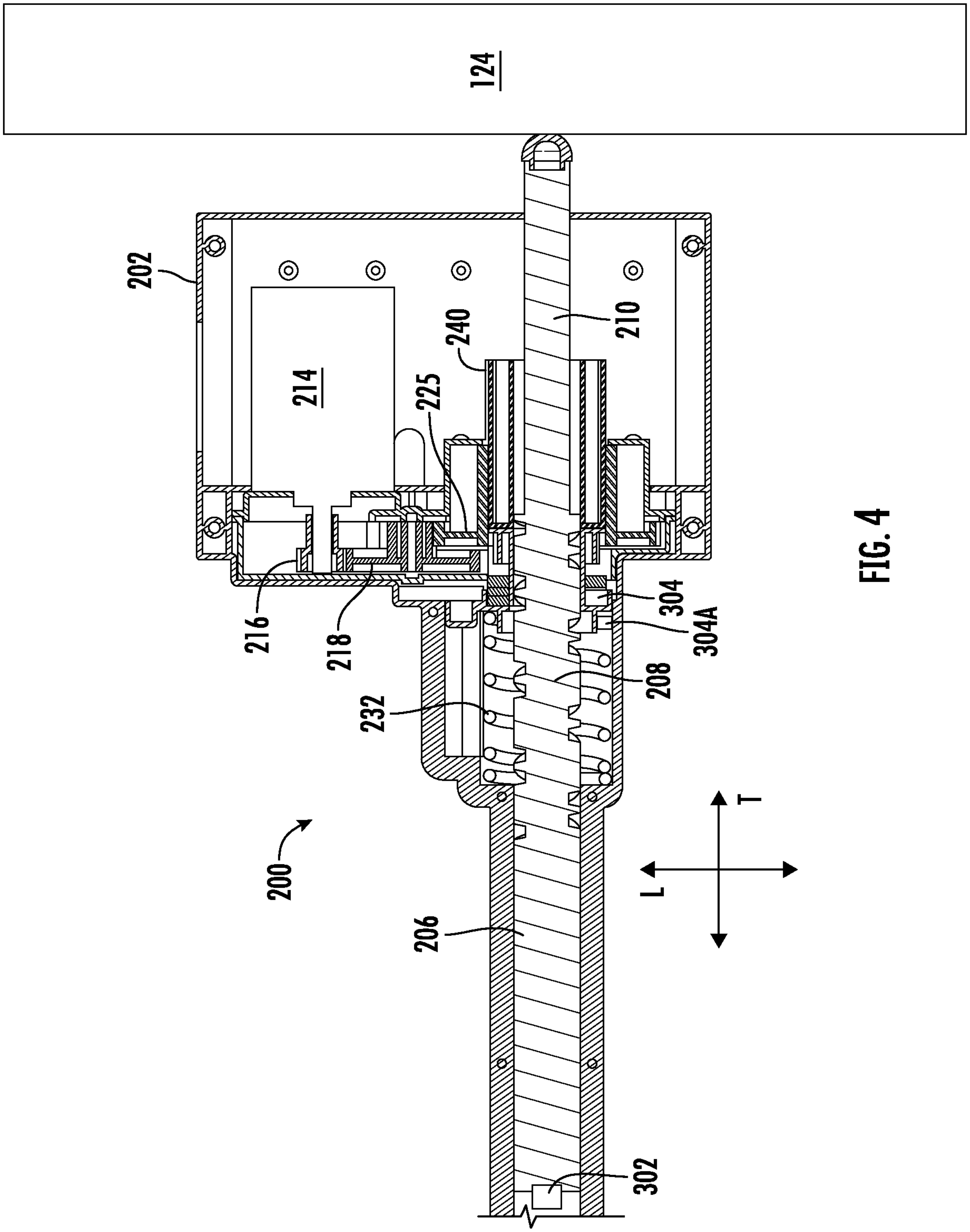
FIG. 4 provides a side section view of an exemplary door opener according to exemplary embodiments of the present disclosure, which may be incorporated into appliances such as the refrigerator appliance of FIG. 1.
Figure 5:
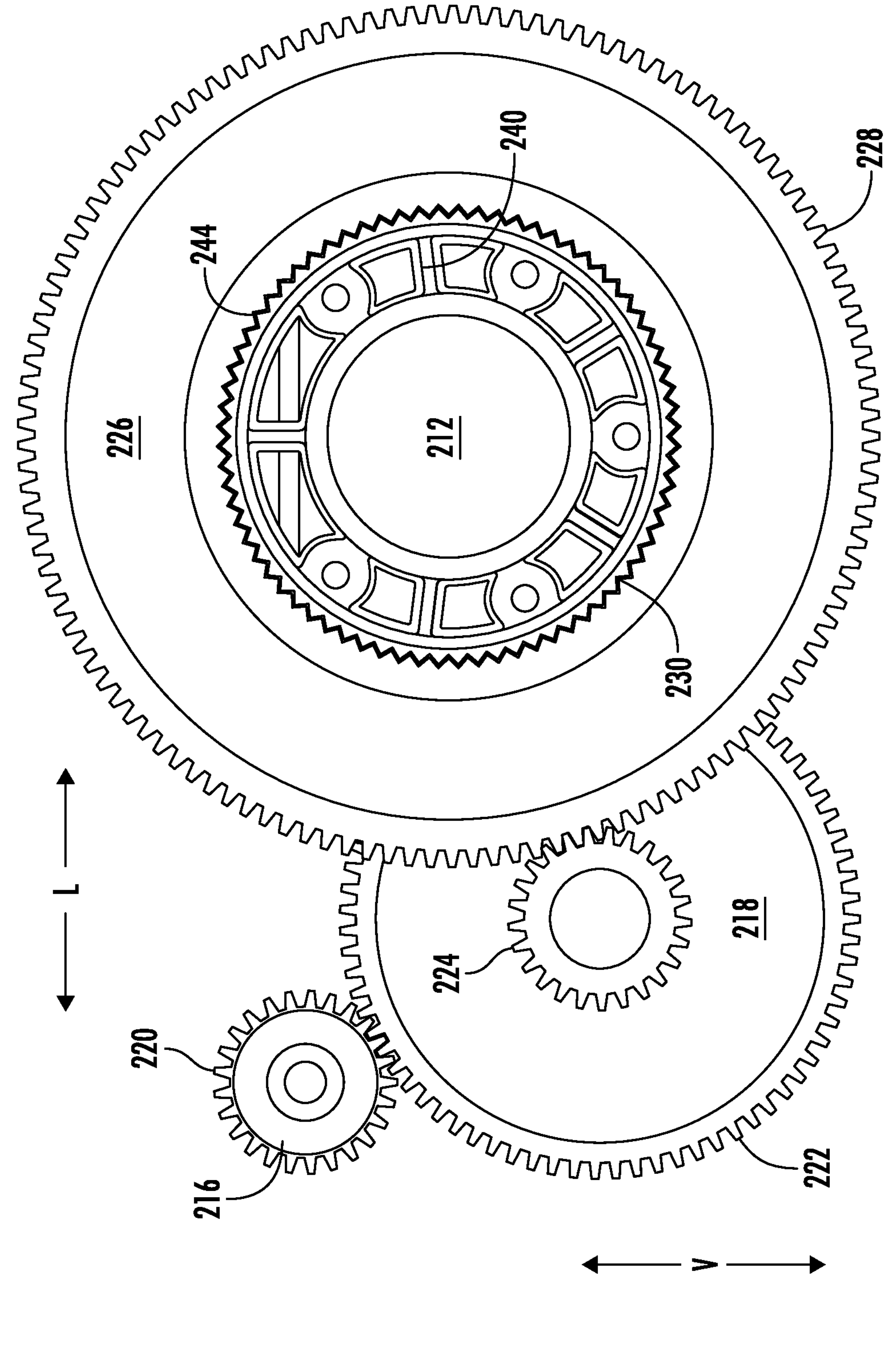
FIG. 5 provides a plan view of a gear set of the exemplary door opener of FIG. 4.
Figure 6:
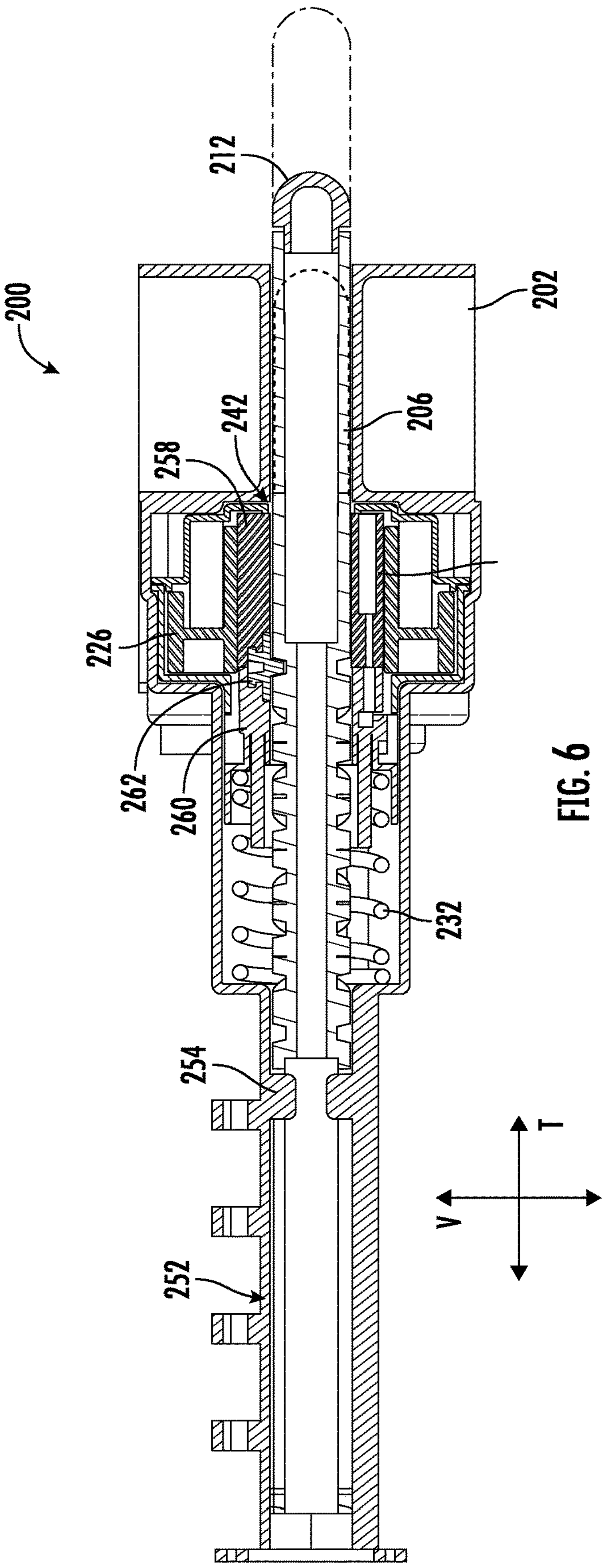
FIG. 6 provides a side section view of a portion of the exemplary door opener of FIG. 4.

Referring still to FIGS. 4 through 6, the door opener 200 may also include a slip yoke 240. The slip yoke 240 may be oriented generally along the transverse direction T. For instance a longest dimension of the slip yoke 240 may be generally parallel to the transverse direction T. The slip yoke 240 may define a lumen 242 extending fully through the slip yoke 240 from front to back. The push rod 206, or a portion thereof, may extend through the slip yoke 240, such as through the lumen 242 of the slip yoke 240. The slip yoke 240 may also include external teeth 244 along at least a portion thereof, and the external teeth 244 of the slip yoke 240 may be engaged with (e.g., directly engaged—where "directly engaged" is used as defined above) with, internal teeth 230 of the gear 226.

Figure 7:
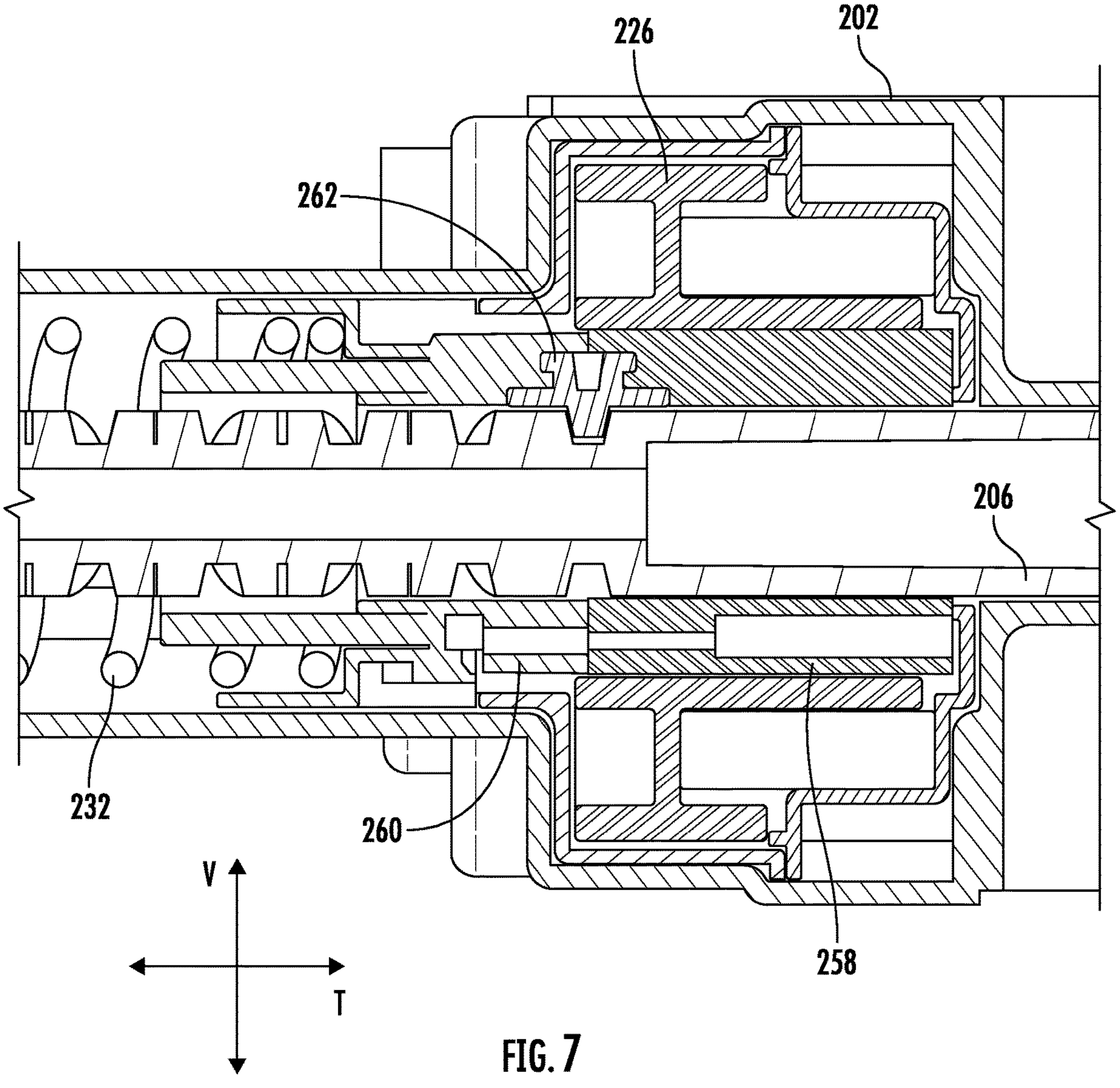
FIG. 7 provides an enlarged side section view of a portion of the exemplary door opener of FIG. 4.
Figure 8:
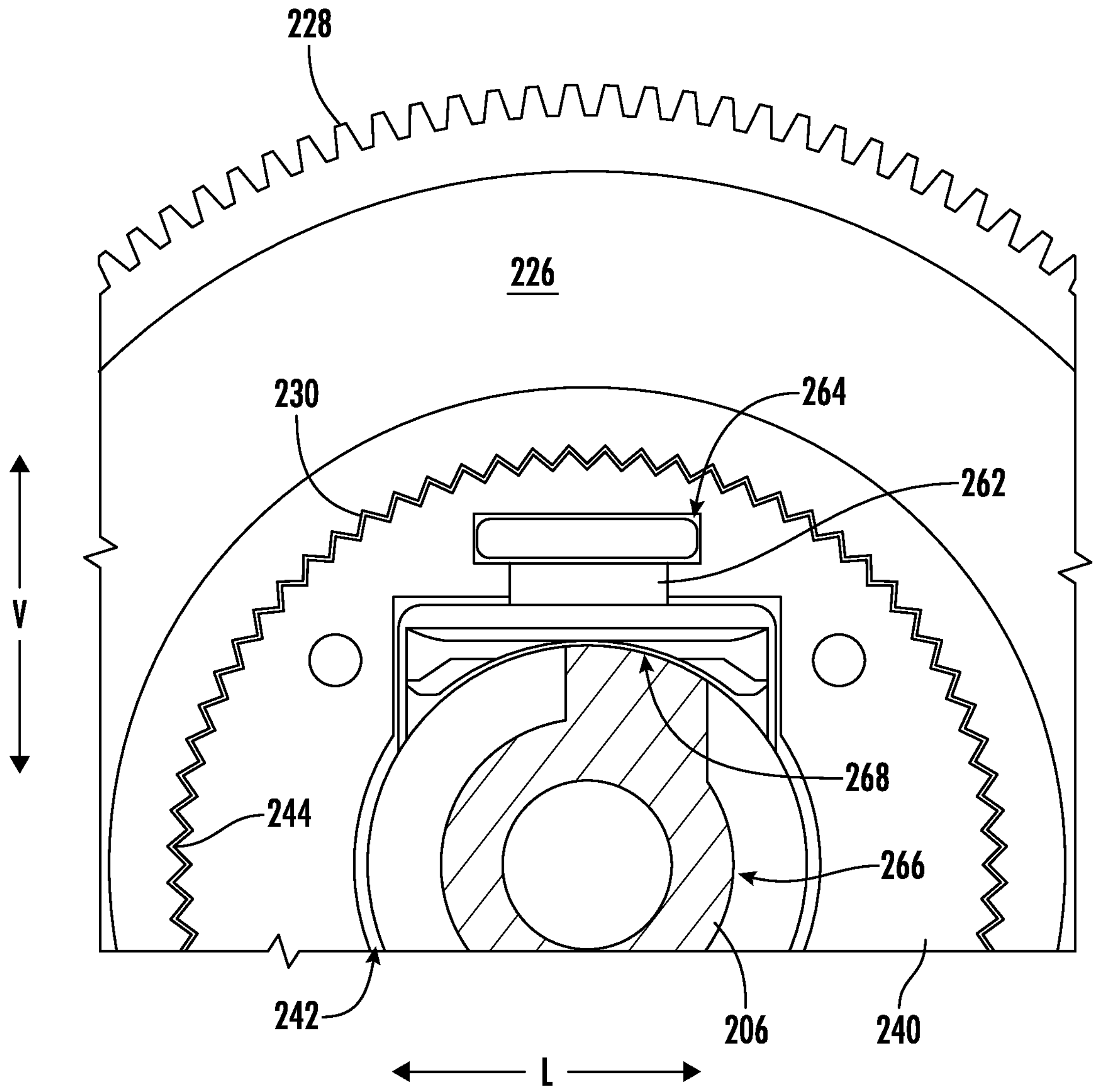
FIG. 8 provides a plan view illustrating certain components of the exemplary door opener of FIG. 4.

Referring now specifically to FIGS. 6 and 7, the slip yoke 240 may be formed of a multi-part construction (e.g., a two-part construction including a front portion 258 and a rear portion 260). In some embodiments, a guide blade 262 may be captured in the slip yoke 240, such as captured between the front portion 258 of the slip yoke 240 and the rear portion 260 of the slip yoke 240. As may be seen, for instance, in FIGS. 7 and 8, the guide blade 262 may be captured in a recess 264 defined in the slip yoke 240. Additionally, it should be noted that FIG. 8 presents a partially-sectioned view of a portion of the door opener 200. In particular, the section in FIG. 8 is taken through the threaded portion 208 of the push rod 206 (e.g., such that the guide blade 262 is partially concealed by crests 268—see also FIG. 10) of the thread of the push rod 206 in FIG. 8. Particular features of the exemplary guide blade 262 will be described in more detail below with reference to FIGS. 10 and 12.

As may be seen in FIGS. 6 through 8, the guide blade 262 engages with the thread on the threaded portion 210 of the push rod 206. For example, the guide blade 262 may move within the thread as the slip yoke 240 rotates around the push rod 206. The guide blade 262 is captured by the slip yoke 240, as described above, such that the guide blade 262 rotates around the push rod 206 as the slip yoke 240 rotates around the push rod 206. The guide blade 262 may also be free to pivot within the recess 264 of the slip yoke 240, such that an angle of the guide blade 262 relative to the push rod 206 varies in response to variations in the pitch of the thread of the push rod 206. Such variations in pitch will be described further below.

Figure 10:
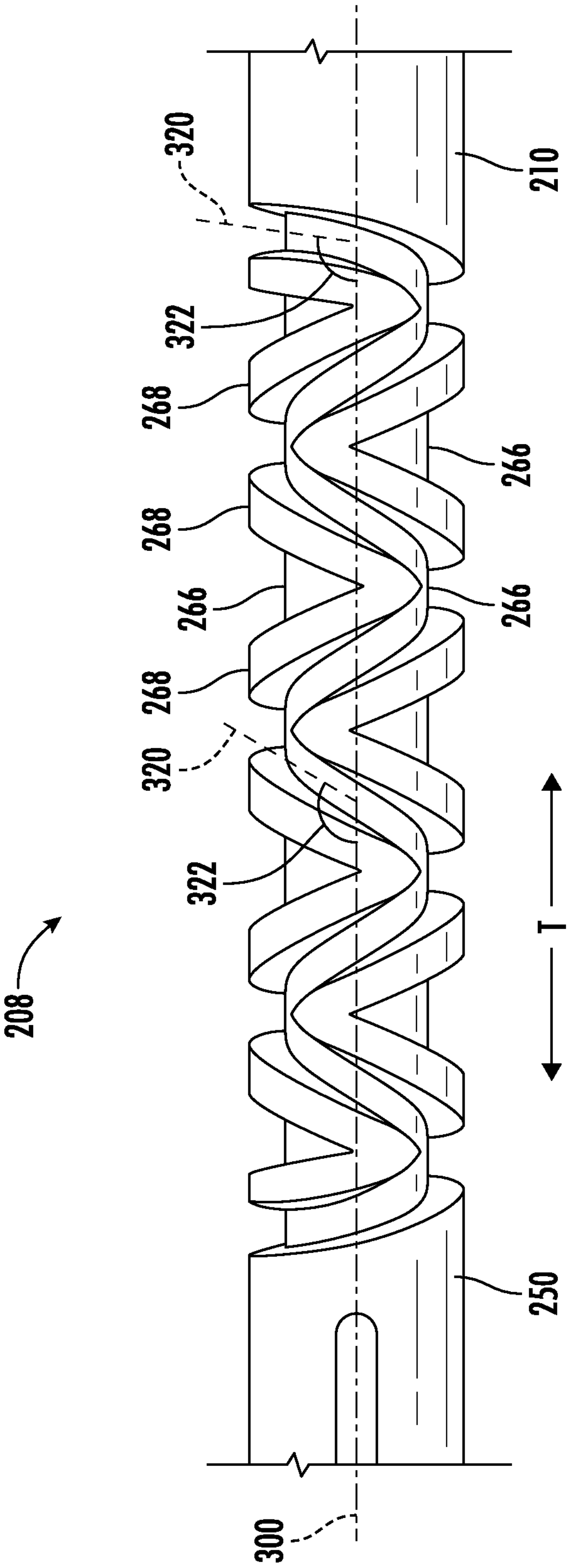
FIG. 10 provides an enlarged view of a portion of the exemplary push rod of FIG. 9.

FIG. 10 provides an enlarged view of the threaded portion 208 of the push rod 206. The push rod 206 defines a longitudinal axis 300, as noted in FIG. 10. Thus, the push rod 206 also defines an axial direction along or parallel to the longitudinal axis 300, as well as a radial direction perpendicular to the axial direction and a circumferential direction extending around the axial direction. As illustrated in FIG. 10, the thread encircles push rod 206 through the threaded portion 208 and defines a series of roots 266 and crests 268. The thread of the push rod 206 may encircle the push rod 206 along the circumferential direction around the longitudinal axis 300 of the push rod 206 and may be oriented at an oblique angle to the radial direction. The thread of the push rod 206 may be a helical thread. For example, the thread may be a double-helical thread which defines a first helical path along which the guide blade 262 travels to urge the push rod 206 forward and a second helical path continuously joined end-to-end with the first helical path, where the guide blade 262 travels along the second helical path to urge the push rod 206 rearward. The helical thread of the push rod 206 may also define a center line 320 (e.g., generally equidistantly spaced between each adjacent crest 268 of the helical thread). As illustrated in FIG. 10, the center line 320 of the helical thread may define a pitch angle 322 relative to the longitudinal axis 300 of the push rod 206. For instance, a forward pitch measured from the longitudinal axis 300 of the push rod 206 towards the front portion 210 of the push rod 206 is annotated in FIG. 10, such as may be defined by the first helical path of a double helical thread, as described above. Although not specifically annotated in FIG. 10, it should be understood that the second helical path of the double helical thread defines a rearward pitch which is generally opposite (e.g., about 180° from) the annotated forward pitch. As may be seen, for instance in FIG. 10, the helical thread of the push rod may define a variable pitch 322, such as the pitch angle 322 may vary across the threaded portion 208 of the push rod 206. For example, the pitch angle 322 may be greater (e.g., steeper) around the center (along the transverse direction T) of the threaded portion 208 and may be less (e.g., shallower) at each transverse (e.g., forward and rear) end of the helical thread across the threaded portion 208.

As mentioned above, the slip yoke 240 rotates around the push rod 206 when the motor 214 is activated (e.g., when the slip yoke 240 rotates along the circumferential direction).

Also as mentioned above, the guide blade 262 is captured within the slip yoke 240 (e.g., such that the guide blade 262 is inhibited from linearly translating along the radial direction towards or away from the longitudinal axis 300 of the push rod 206), and the guide blade 262 also rotates with the slip yoke 240 about the push rod 206 along the circumferential direction when the motor 214 is activated. The guide blade 262 may also be pivotal within the slip yoke 240 (e.g., within the recess 264 thereof) such as the guide blade 262 may pivot generally about the radial direction. Thus, the guide blade 262 may contact and engage with the helical thread, such as at least the crest 268 thereof, of the push rod 206 while the slip yoke 240 rotates around the push rod 206, and the guide blade 262 may, as a result of such engagement, urge the push rod 206 to reciprocate (e.g., forward and rearward), along the transverse direction T. Further, the rate of travel of the push rod 206 may be proportional to the pitch 322 of the thread. For example, the push rod 206 may travel faster when the guide blade 262 traverses the steeper pitched middle portion of the helical thread and slower when the guide blade travels through one of the shallower pitched end portions of the helical thread. Thus, the door opener 200 may thereby have a brief dwell time at one or both of the zero position and the fully extended position EP. For example, dwelling in the fully extended position EP may provide a user an opportunity to grasp the door 124 and pull the door 124 the rest of the way open (e.g., from a partially open position to a fully open position). Such dwell time or times at one or both extremes of the transverse range of movement of the push rod 206 may also or instead be provided by altering (e.g., slowing to a non-zero value or stopping), the speed of the motor 214.

Figure 12:
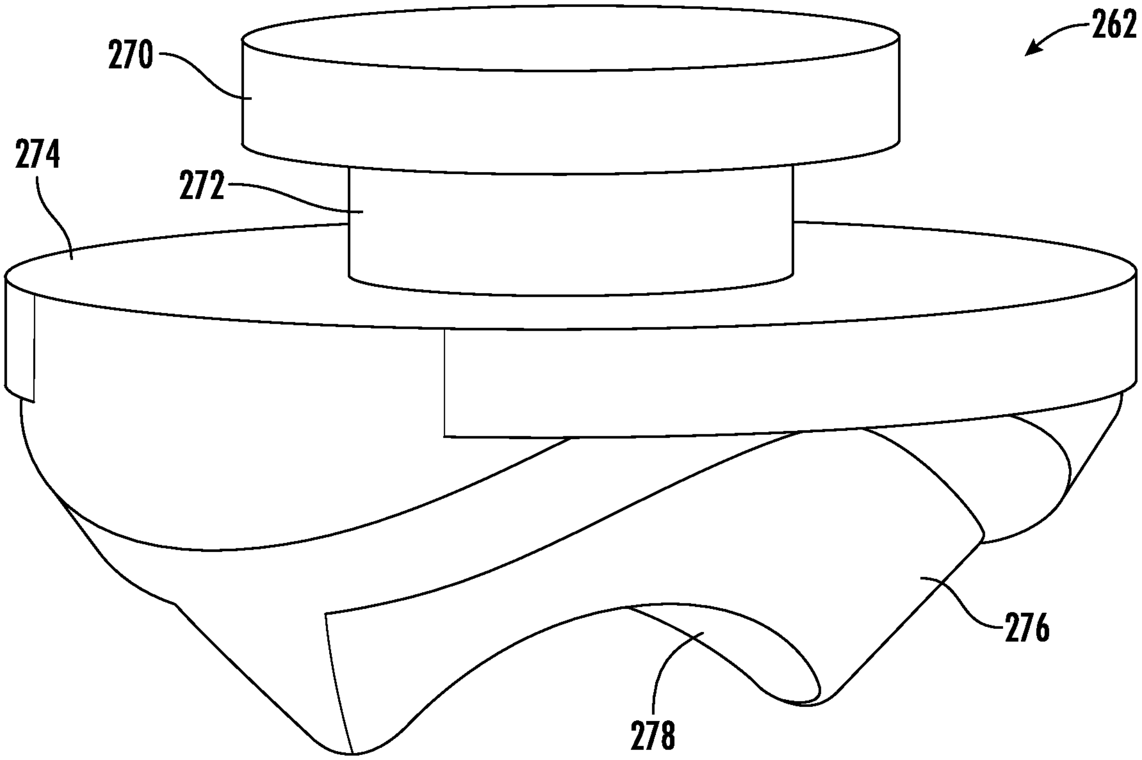
FIG. 12 provides a perspective view of a guide blade of the exemplary door opener of FIG. 4.

An exemplary guide blade 262 is illustrated in a perspective view in FIG. 12. As may be seen in FIG. 12, the guide blade 262 may include an outer flange 270, where "outer" refers to farther away from the push rod 206, such as from the longitudinal axis 300 thereof along the radial direction. The outer flange 270 may be captured within a larger portion of the recess 264 in the slip yoke 240 (see, e.g., FIG. 8) and may be directly adjoined by a neck 272 of the guide blade 262, where the neck 272 is narrower (e.g., defines a lesser outer diameter, than the flange 270). The neck 272 may be captured in a narrower portion of the recess 264 in the slip yoke 240 than the flange 270 is, and thus the flange 270 may help to constrain the guide blade 262 against linear movement along the radial direction (e.g., towards or away from the push rod 206). As may be seen in FIG. 12, the flange 270 and neck 272 may be rounded (e.g., circular) in their cross-sectional shape, such as in a cross-section generally perpendicular to the radial direction. Additionally, the guide blade 262 may also include a base 274 which directly adjoins the neck 272 at an opposite end of the neck 272 from the end at which the neck 272 adjoins the flange 270, and the base 274 may also define a rounded (e.g., circular) cross-sectional shape. Further, the corresponding portions of the recess 264 in the slip yoke 240 may each define complementary rounded shapes to permit the guide blade 262 to pivot within the recess 264 (e.g., generally about the radial direction), as described above, such as to promote consistent engagement and contact of the guide blade 262, and in particular a tapered blade portion 276 thereof, with the helical thread of the push rod 206, especially in embodiments where the helical thread defines a variable pitch. The tapered blade portion 276 (which is partially obstructed from view in FIG. 8 by the thread, as noted in the above discussion of FIG. 8) of the guide blade 262 may extend from the base 274 of the guide blade 262, such as towards the push rod 206 (e.g., towards the longitudinal axis 300 thereof) when the guide blade 262 is assembled within the slip yoke 240 and the push rod 206 extends through the lumen 242 of the slip yoke 240, as described above. The tapered blade portion 276 may terminate at a concave curved surface 278. The concave curved surface 278 may be generally complimentary to the roots 266 of the thread of the push rod 206. When the door opener 200 is fully assembled, the concave curved surface 278 may be generally parallel to and spaced apart from the roots 266 of the thread of the push rod 206 (e.g., as may be seen in FIG. 7).

The guide blade 262 may be constructed of any suitable low-friction material. For example, the guide blade 262 may comprise a low-friction polymeric (e.g., plastic) material, such as acetal plastic or nylon material.

Figure 13:
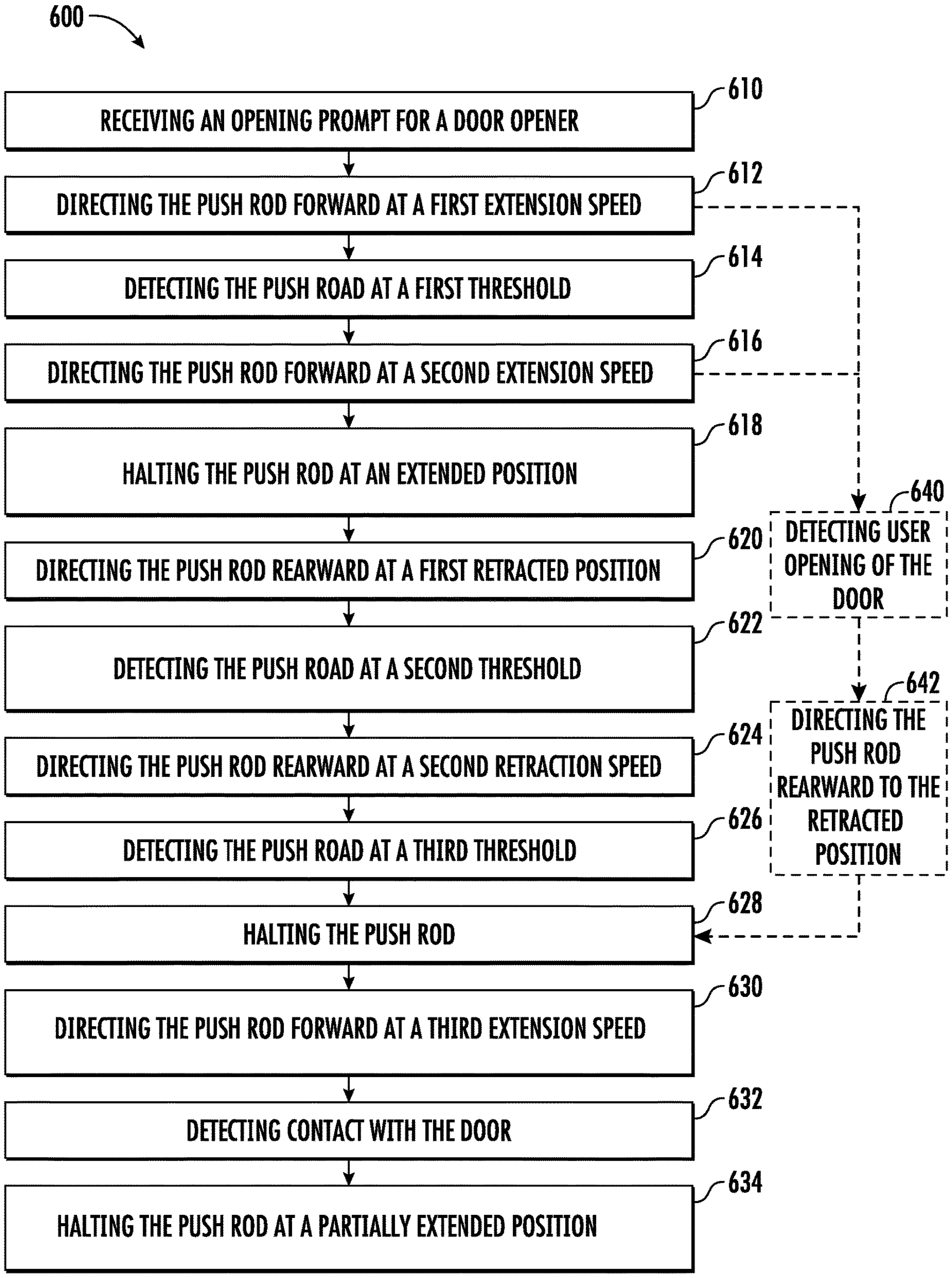
FIG. 13 provides a flow chart illustrating a method of operating a refrigerator appliance according to exemplary embodiments of the present disclosure.

Turning to FIG. 13, now that the construction of refrigerator appliance 100 and opener 200, along with the configuration of controller 150 according to exemplary embodiments have been presented, exemplary methods (e.g., 600) of operating one or more washing machine appliances will be described. Although the discussion below refers to the exemplary method of operating refrigerator appliances (e.g., appliance 100) or door opener (e.g., opener 200), one skilled in the art will appreciate that the above described structures are merely exemplary and, except to the extent it is specified otherwise, no such structure is required for the method 600. In other words, the appliance 100 and opener 200 are merely exemplary and any suitable appliance (e.g., having a cabinet and door) or opener (e.g., configured to at least partially open the door) may be provided. Thus, exemplary method 600 is applicable to the operation of a variety of other refrigerator appliances or appliances in general. In exemplary embodiments, the various method steps as disclosed herein may be performed (e.g., in whole or in part) by controller 150.

FIG. 6 depicts steps performed in a particular order for purpose of illustration and discussion. Those of ordinary skill in the art, using the disclosures provided herein, will understand that the steps of the method 600 can be modified, adapted, rearranged, omitted, interchanged, or expanded in various ways without deviating from the scope of the present disclosure.

Advantageously, methods in accordance with the present disclosure may ensuring consistent opening results for a door (e.g., over time). Additionally or alternatively, such methods may advantageously maintain alignment between a door opener and a door (e.g., automatically or without direct user intervention). Further additionally or alternatively, such methods may act to open a door at a quiet or low volume level.

At 610, the method 600 includes receiving an opening prompt for a door opener. The opening prompt may generally indicate a user's desire for automatic door opening. In some embodiments, 610 includes detecting door movement at the push rod at a partially extended position. In other words, while the push rod is in the partially extended (e.g., first zero) position, door movement (e.g., as initiated by a user) may be detected. Door movement may be detected, for instance, as rearward movement, such as might occur in response to a user pushing the door in the closed position. As described above, the partially extended position of the push rod is between a retracted position and an extended position defining the movement path of the push rod.

Optionally, door movement may be detected in 610 based on one or more monitored sensor signals (i.e., load signals). Thus, 610 may including monitoring sensor output of one or more sensors (e.g., rod-load sensor). Moreover, 610 may include detecting (e.g., rearward) movement of the push rod and, thus, the door. Detected rearward movement may be based on variations in the sensor output (e.g., variations in successive load signal values above a predetermined input variation threshold). In some such embodiments, 610 thus includes detecting a variation in the sensor output (e.g., as an input spike) while monitoring sensor output. Moreover, the detected variation may be determined to be above the predetermined input variation threshold. For instance, a user may pushing rearward on the door in the closed position may move the push rod rearward from the partially extended (e.g., first zero) position, resulting in an increased load on the rod-load sensor.

At 612, the method 600 includes directing the push rod forward at a first extension speed (e.g., following or in response to 610), such as from the partially extended or retracted position (e.g., if the door is pushed back to the same during 610). For instance, the motor of the door opener may be directed to advance the push rod toward, though not necessarily to, the extended position. The first extension speed may be predetermined and, for instance, constant (e.g., for a duration of a first segment of 612 to 614).

At 614, the method 600 includes detecting the push rod at a first threshold. As described above, the first threshold may be defined as a point along the movement path of the push rod between the retracted and extended positions and is forward from the retracted position or first zero position. Moreover, the first threshold may be rearward from the extended position.

In some embodiments, the detection at 614 is based on one or more received sensor signals (e.g., sensor output). Thus, the method 600 may include monitoring sensor output at the position sensor or rod-load sensor while directing the push rod forward at 612. Specifically, as the push rod is moved forward towards the first threshold, position signals or load signals may be received from the position sensor or rod-load sensor, respectively (e.g., according to a set pattern or rate). Moreover, the method 600 may include evaluating the received signals to determine the position of the push rod (e.g., along the movement path) is at a given moment and thus, when the push rod is at the first threshold.

At 616, the method 600 includes directing the push rod forward at a second extension speed (e.g., following or in response to 614). The push rod may be directed forward from the first threshold. For instance, the motor of the door opener may be directed to advance the push rod at the second extension speed from the first threshold and toward the extended position. The second extension speed may be less than the first extension speed. Additionally or alternatively, the second extension speed may be predetermined and, for instance, constant (e.g., for a duration of a second segment of 616 to 618).

At 618, the method 600 includes halting the push rod at an extended position. The extended position may, for instance, be a fully extended position.

In some embodiments, 618 includes detecting the extended position. Detection at 618 may be based on one or more received sensor signals (e.g., sensor output). Thus, the method 600 may include monitoring sensor output at the position sensor or rod-load sensor while directing the push rod forward at 616. Specifically, as the push rod is moved forward toward the extended position or otherwise beyond the first threshold, position signals or load signals may be received from the position sensor or rod-load sensor, respectively (e.g., according to a set pattern or rate). Moreover, the method 600 may include evaluating the received signals to determine the position of the push rod (e.g., along the movement path) is at a given moment and thus, when the push rod is at the extended position. Moreover, the motor of the door opener may be stopped (e.g., for a set period of time) or simply redirected to a rearward movement orientation.

As described above, the push rod may be driven by a unidirectional motor such that after reaching the extended position, the push rod halts briefly (i.e., to change directions) before moving rearward. Of course, other embodiments or door opener may move the push rod rearward via another suitable mechanism.

At 620, the method 600 includes directing the push rod rearward at a first retraction speed. Specifically, the push rod may be directed rearward at a first retraction speed following the forward movement at 612 or 616. The push rod may be directed rearward from the extended threshold. For instance, the motor of the door opener may be directed to retract the push rod at the first retraction speed from the extended and toward, though not necessarily to, the retracted position. The magnitude or absolute value of the first retraction speed may be less than the magnitude or absolute value of the first extension speed. Additionally or alternatively, the magnitude or absolute value of the first retraction speed may substantially equal to the magnitude or absolute value of the second extension speed. Further additionally or alternatively, the first retraction speed may be predetermined and, for instance, constant (e.g., for a duration of a third segment of 620 to 622).

At 622, the method 600 includes detecting the push rod at a second threshold. As described above, the second threshold may be defined as a point along the movement path of the push rod between the retracted and extended positions. Moreover, the second threshold may be rearward from the extended position. Additionally or alternatively, the second threshold may be equal to (e.g., at the same location relative to the movement path as) the first threshold.

In some embodiments, the detection at 622 is based on one or more received sensor signals (e.g., sensor output). Thus, the method 600 may include monitoring sensor output at the position sensor or rod-load sensor while directing the push rod rearward at 622. Specifically, as the push rod is moved rearward towards the second threshold, position signals or load signals may be received from the position sensor or rod-load sensor, respectively (e.g., according to a set pattern or rate). Moreover, the method 600 may include evaluating the received signals to determine the position of the push rod (e.g., along the movement path) is at a given moment and thus, when the push rod is at the second threshold.

At 624, the method 600 includes directing the push rod rearward at a second retraction speed (e.g., following or in response to 622). The push rod may be directed rearward from the second threshold. For instance, the motor of the door opener may be directed to retract the push rod at the second retraction speed from the second threshold and toward the retracted position. The second retraction speed may be greater than the first retraction speed. Additionally or alternatively, the magnitude or absolute value of the second retraction speed may greater than the magnitude or absolute value of the second extension speed. Further additionally or alternatively, the magnitude or absolute value of the second retraction speed may less than the magnitude or absolute value of the first extension speed. Still further additionally or alternatively, the second retraction speed may be predetermined and, for instance, constant (e.g., for a duration of a fourth segment of 624 to 626).

At 626, the method 600 includes detecting the push rod at a third threshold. As described above, the third threshold may be defined as a point along the movement path of the push rod between the retracted and extended positions. Moreover, the third threshold may be rearward from the extended position or the second threshold. Additionally or alternatively, the third threshold may be equal to (e.g., at the same location relative to the movement path as) the retracted position.

In some embodiments, the detection at 626 is based on one or more received sensor signals (e.g., sensor output). Thus, the method 600 may include monitoring sensor output at the position sensor or rod-load sensor while directing the push rod rearward at 624. Specifically, as the push rod is moved rearward towards the third threshold, position signals or load signals may be received from the position sensor or rod-load sensor, respectively (e.g., according to a set pattern or rate). Moreover, the method 600 may include evaluating the received signals to determine the position of the push rod (e.g., along the movement path) is at a given moment and thus, when the push rod is at the third threshold.

At 628, the method 600 includes halting the push rod (e.g., following or in response to 626). For instance, the motor of the door opener may be stopped (e.g., for a set period of time) or simply redirected to a forward movement orientation. As described above, the push rod may be driven by a unidirectional motor such that after reaching the retracted position, the push rod halts briefly (i.e., to change directions) before moving forward. Of course, other embodiments or door opener may move the push rod rearward via another suitable mechanism.

At 630, the method 600 includes directing the push rod forward at a third extension speed (e.g., following or in response 628). The push rod may be directed forward from the third threshold. For instance, the motor of the door opener may be directed to advance the push rod at the third extension speed from the third threshold and toward, though not necessarily to, the extended position. The third extension speed may be less than the first or second extension speeds. Additionally or alternatively, the second extension speed may be predetermined and, for instance, constant (e.g., for a duration of a fifth segment of 630 to 632).

At 632, the method 600 includes detecting contact with the door (i.e., contact between the push rod and the door), such as while directing the push rod forward at the third extension speed. Detection at 632 may be based, for instance, on one or more received rod-load sensor signals (i.e., load signals). Thus, the method 600 may include monitoring sensor output at the rod-load sensor while directing the push rod forward at 630. Specifically, as the push rod is moved forward toward the extended position or otherwise beyond the third threshold, load signals may be received from the rod-load sensor (e.g., according to a set pattern or rate). Moreover, the method 600 may include evaluating the received signals to determine the load on the push rod (e.g., along the movement path) at a given moment. Determination of contact may be, for instance, based on variations in the sensor output (e.g., variations in successive load signal values above a predetermined contact variation threshold). In some such embodiments, 632 thus includes detecting a variation in the sensor output during monitoring. Moreover, the detected variation may be determined to be above the predetermined contact variation threshold.

At 634, the method 600 includes halting the push rod at a partially extended position (e.g., following or in response to 632). For instance, once contact with the door is determined, further forward movement of the push rod may be stopped. The push rod may be held at that same partially extended (e.g., new zero) position at which the push rod is stopped. Thus, the push rod may be held in contact with the door (e.g., until a new prompt is received, such as at 610).

At 640, the method 600 includes detecting user opening of the door. In particular, in optional embodiments, during 612 or 616, a user may choose to interrupt a portion of an opening operation and manually open the door before the push rod has fully extended. Thus, 640 may follow (at least a portion of) 612 or 616.

In some embodiments, 640 includes detecting a variation above a set condition (e.g., at the rod-load sensor). As described above, the variation at 640 may indicate, and thus, detect a mechanical load reduction on the push rod. For instance, a relatively large decrease in load (e.g., over the time of an unanticipated segment) may be detected. Moreover, it may be determined that the variation is above the set condition. In response to such a determination, the door opener may respond, such as by withdrawing the push rod to the retracted position. Notably, the push rod may be protected from inadvertent or sudden strikes, door closing, or damage.

At 642, the method 600 includes directing the push rod rearward to the retracted position (e.g., following or in response to 640). For instance, the motor may drive the push rod such that the push rod (e.g., a tip thereof) is withdrawn into or within the casing or cabinet. As described above, the push rod may be driven by a unidirectional motor such that after reaching the extended position, the push rod moves rearward and, thus, may be moved all the way to the retracted position. Of course, other embodiments or door opener may move the push rod rearward via another suitable mechanism.

Following 642, the method 600 may proceed to 628 and continue as described above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance defining a vertical direction, a lateral direction, and a transverse direction, the vertical, lateral, and transverse directions being mutually perpendicular, the refrigerator appliance comprising:

a cabinet defining a food storage chamber, the food storage chamber extending between a front portion and a back portion along the transverse direction, the front portion of the food storage chamber defining an opening for receipt of food items;

a door positioned at the front portion of the food storage chamber and movable between a closed position and an open position to selectively sealingly enclose the food storage chamber in the closed position and provide access to the food storage chamber in the open position;

a door opener attached to the cabinet, the door opener comprising a casing fixedly mounted to the cabinet, a push rod extending through the casing towards the door and movable relative to the casing between a retracted position and an extended position to motivate the door toward the open position, and a position sensor attached to the cabinet to detect a position of the push rod relative to the casing; and a controller in operable communication with the door opener and configured to direct an opener operation, the opener operation comprising receiving an opening prompt for the door opener, directing the push rod forward at a first extension speed in response to the received opening prompt, detecting the push rod at a first threshold between the retracted position and the extended position, directing the push rod forward at a second extension speed in response to detecting the push rod at the first threshold, the second extension speed being less than the first extension speed, directing the push rod rearward at a first retraction speed following directing the push rod forward at the second extension speed, detecting the push rod at a second threshold between the extended position and the retracted position while directing the push rod rearward, detecting the push rod at a third threshold, halting the push rod in response to detecting the third threshold, and directing the push rod forward at a third extension speed following halting the push rod, wherein the third extension speed is less than the second extension speed.

2. The refrigerator appliance of claim 1, wherein receiving the opening prompt comprises detecting door movement at the push rod at a partially extended position of the push rod between the retracted position and the extended position.

3. The refrigerator appliance of claim 1, wherein the opener operation further comprises halting the push rod at the extended position.

4. The refrigerator appliance of claim 1, wherein the opener operation further comprises directing the push rod rearward at a second retraction speed in response to detecting the push rod at the second threshold, the second retraction speed being greater than the first retraction speed.

5. The refrigerator appliance of claim 4, wherein the opener operation further comprises detecting contact with the door while directing the push rod forward at the third extension speed, and halting the push rod at a partially extended position in response to detecting contact.

6. The refrigerator appliance of claim 1, wherein the opener operation further comprises detecting user opening of the door following directing the push rod forward at the second extension speed, and directing the push rod rearward to the retracted position in response to detecting user opening of the door.

7. The refrigerator appliance of claim 6, wherein detecting user opening of the door comprises detecting a variation above a set condition at a rod-load sensor to detect a mechanical load reduction on the push rod.

* * * * *